Oct. 25, 1966  F. L. WENINGER  3,281,200
FILM CARTRIDGE
Filed Feb. 28, 1964  2 Sheets-Sheet 1
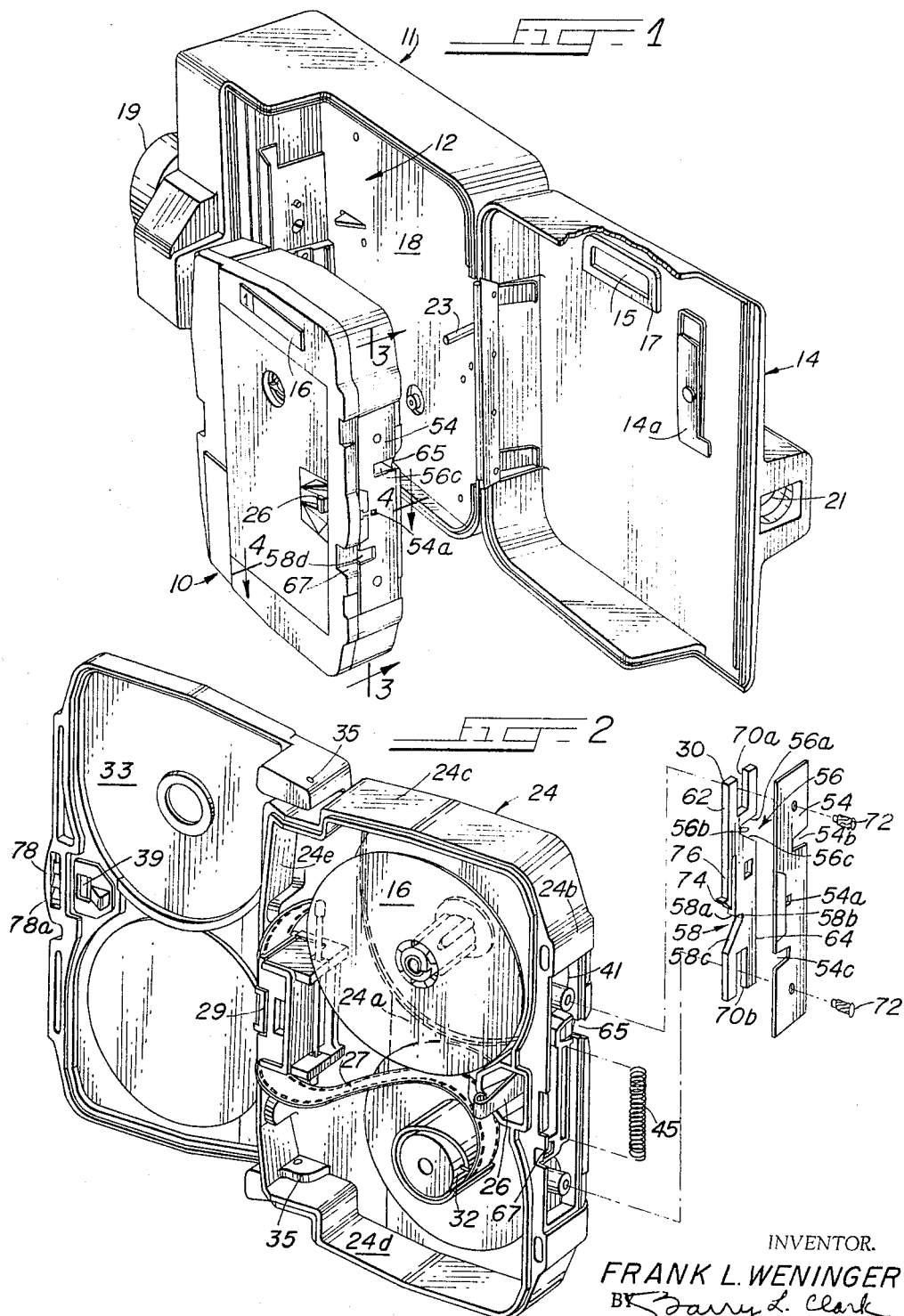
INVENTOR.
FRANK L. WENINGER Oct. 25, 1966  F. L. WENINGER  3,281,200
FILM CARTRIDGE
Filed Feb. 28, 1964  2 Sheets-Sheet 2
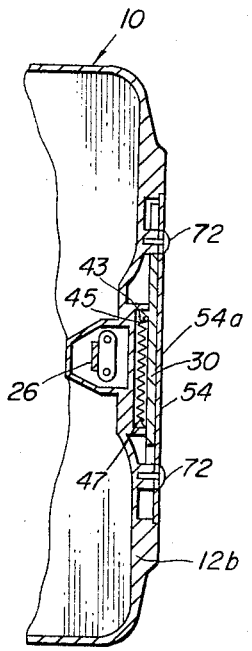
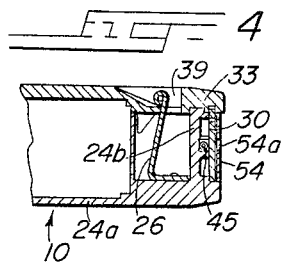
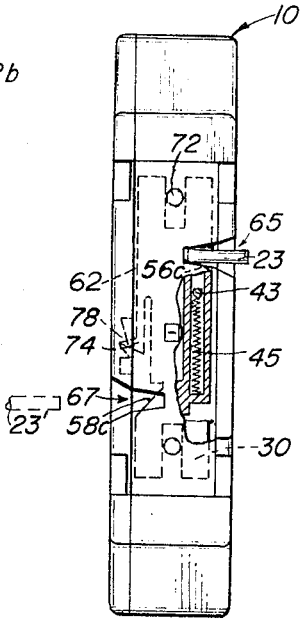
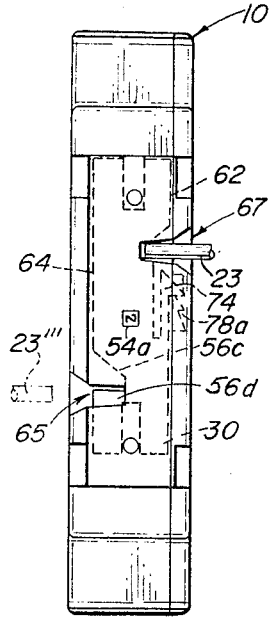
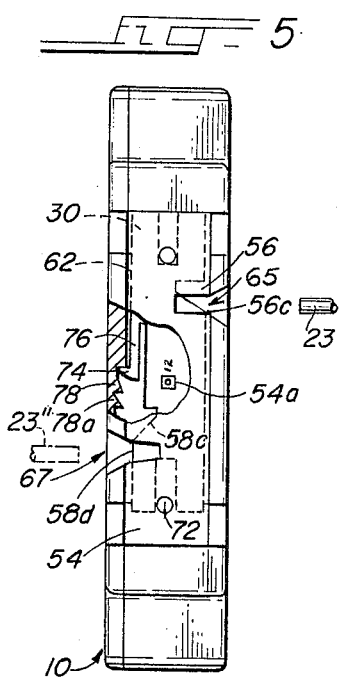
INVENTOR.
FRANK L. WENINGER United States Patent Office 3,281,200
Patented Oct. 25, 1966

3,281,200
FILM CARTRIDGE
Frank L. Weninger, Chicago, Ill., assignor to Bell & Howell Company, Chicago, Ill., a corporation of Illinois
Filed Feb. 28, 1964, Ser. No. 348,082
9 Claims. (Cl. 352—78)

This invention relates to a reversible film cartridge for double run film and particularly to a cartridge which cannot be completely inserted in a motion picture camera erroneously, either initially or after exposure of both sides of the film in the cartridge.

As is well known, 8 mm. double run motion picture film is inserted into the camera, run through, turned over, re-inserted, and run back through the camera. The term "reversible cartridge" as herein used, is intended to describe a cartridge which has two sides, and which may be inserted into the camera with either side facing toward the cover of the camera chamber. "Side 1" is the side properly facing the cover when the film which has just been loaded into the cartridge is on the supply spool. "Side 2" is the side properly facing the cover when the film has been run through the camera and is on the take-up spindle.

Reversible cartridges are normally inserted into the camera on two occasions. These are: (1) the insertion of the cartridge for the first time with unexposed film wherein "Side 1" faces the camera cover and (2) the reversal or turnover and re-insertion of the cartridge for exposure of the second film run wherein "Side 2" faces the camera cover. After the running through of "Side 2," the cartridge is removed and the film taken out of it for subsequent processing.

If a cartridge camera is to perform satisfactorily, the camera must not transport all of the film to the take-up spool during the exposure of "Side 1" since a certain minimum quantity of film must remain on the supply spool to insure that this spool will be capable of taking up the film during the exposure of "Side 2." Should a threaded, unexposed cartridge be inadvertently inserted into a camera with "Side 2" facing the cover, the end which was threaded onto the take-up spindle will be pulled off and no pictures will be obtained. The cartridge comprising the present invention includes a blocking device for preventing a cartridge from being inserted second side first. It also includes a blocking device for preventing the re-exposure of the first side after both sides have been exposed.

The cartridge which forms the subject matter of the present invention also has indicia means which are visible when the cartridge is removed from the camera. These indicia are used to indicate when none of the film is exposed, when one side is exposed, and when both sides are exposed.

An object of this invention is to provide a film cartridge which cannot be completely inserted into a camera in other than a correct manner.

Another object of the invention is the provision of a cartridge indicator having a blocking means adapted to coact with a cooperating portion in the camera to prevent complete insertion of the cartridge in a wrong manner.

A still further object of the invention is to provide a cartridge having an indicator means which is economical, easy to manufacture, and fool-proof in its use.

Further objects of the invention will be seen from the detailed description, the claims, and the drawings which form a part of the specification in which:

FIGURE 1 is a perspective view of a camera and a cartridge which is insertable in a cartridge chamber in the camera.

FIGURE 2 is a slightly enlarged exploded view of the cartridge and the parts thereof.

FIGURE 3 is a view taken along cross-section line 3—3 of FIGURE 1.

FIGURE 4 is a view taken along cross-section line 4—4 of FIGURE 1.

FIGURES 5, 6 and 7 disclose various positions of the cartridge indicator as viewed from the rear of the cartridge with some parts partially broken away.

In FIGURE 1 is disclosed a typical motion picture camera body 11 having a cartridge chamber 12 therein in which a film containing cartridge of the instant type is inserted. Chamber 12 is closed and made light tight by a hinged cover 14 which is locked by latch 14a to retain the cartridge 10 therein. In the cover 14 is a window 15 through which a data plate 16 on the side of a cartridge can be read with the cover closed. The window 15 is surrounded by a resilient material 17, such as sponge rubber to prevent light leakage beyond the window area. In the chamber opposite the cover is a cartridge support plate 18 against which cartridge 10 is seated when in operable position. Mounted on the cartridge support plate 18 is a cam actuating pin 23 intended to selectively cooperate with cam surfaces on indicator plate 30 in the cartridge when the cartridge is correctly inserted into the camera. The camera body 11 also has the usual lens 19 and an appropriate viewfinder 21.

The cartridge 10, as shown in FIGURE 2, is formed of a body member 24 having a recessed bottom portion 24a and side portions 24b, 24c, 24d and 24e. The film 27 on a spool 28 is inserted into the recessed bottom portion 24a and threaded past the pressure shoe assembly 29 to the take-up spindle 32.

A cartridge cover member 33, pivotally attached at cover hinge 35, cooperates with body member 24 to form a light tight chamber. Spring latch member 26, mounted in the body member 24, passes through aperture 39 in the cartridge cover member 33 at which time it snaps over the cover member to positively retain the cover member in a closed position, as shown in FIGURE 4.

Back side portion 24b of the body member has a recess 41 therein. Within this recess 41 is located an indicator plate 30 carrying indicia "0," "1," "2" on the face thereof. A protuberance 43 on the reverse side of the plate forms a seat for one end of a coil spring 45. The other end of spring 45 is seated on a portion 47 of the recess 41. The recess 41 and parts therein are substantially covered by a cover plate 54 having a window 54a therein through which the indicia may be read when they are aligned with the window. Also in cover plate 54 are a pair of side openings 54b, 54c for a purpose to be hereinafter described.

The elongated indicator plate 30, shown in FIGURE 2, which is preferably formed of plastic and is a generally rectangular shape, has a pair of spaced notches 56, 58 on opposed lateral sides 62, 64 of the rectangle. The back side portion 24b has spaced recesses 65, 67 aligned with the side openings 54b, 54c of the cover plate and are spaced differently than the spacing of notches 56, 58. These notches each have straight portions 56a, 58a perpendicular to the lateral sides 62, 64 of the indicator plate 30, bottom portions 56b, 58b parallel to the lateral sides, and cam surface portions 56c, 58c angled with respect to the lateral sides. In the end sides of the plate are cut-outs 70a, 70b which permit the plate to move longitudinally in recess 41 with respect to the body member 24 and retaining means 72 which fasten the cover plate 54 to the back side portion 24b.

Along the lateral side 62 of indicator plate 30 is a detent engaging tooth 74 which extends a little beyond the lateral edge of back side portion 24b. This tooth 74 is formed on the end of the arm portion 76 so as to have limited resilience. The resilience permits the tooth 74 to be moved to selectively engage either of the detents 78, 78a on the interior of cover member 33 adjacent aperture 39 when the cover member is closed. When the indicator plate 30 is shifted longitudinally against the urging of coil spring 45, one of the detents 78, 78a and the tooth 74 engage one another to retain the plate against return movement.

Movement of the indicator plate 30 is caused by engagement of one of the cam surfaces 56c, 58c by cam engaging pin 23 mounted in the body of the camera 11. When the cartridge is properly inserted into the camera body, the pin 23 will enter one of the recesses 65, 67 and associated notches 56, 58. As shown in FIGURE 5, as the pin 23 enters recess 65 and notch 56, it will engage cam surface 56c of the indicator plate and move the plate against the urging of spring 45 until the cartridge is seated in the cartridge chamber 12 of the camera. The tooth 74 will simultaneously be moved to engage the detent 78. As the indicator plate 30 is transposed, the indicium "0" in window 54a will be changed to indicium "1." (See FIGURE 6.)

A general description of the operation is as follows:

When the operator opens the cover member 33 to load the cartridge with film, the indicator plate 30 is held at one extent of its path by the spring 45 (viewing the cartridge as in FIGURE 5). In the window 54a in cover plate 54, the indicium "0" appears to indicate to the camera operator that none of the film in the cartridge has been exposed. As the cartridge is properly inserted into the camera, the cam surface 56c will be brought against cam engaging pin 23 until it seats as shown at 23' in FIGURE 6. This action will longitudinally transpose the indicator plate 30 such that indicum "1" will be aligned with window 54a. The cartridge will then seat on cartridge support plate 18 in cartridge chamber 12.

After completing exposure of one run of film, the indicium "1" continues to appear in the window 54a as the indicator plate remains shifted a small amount and is retained by tooth 74 in the position to which the plate was moved by cam engaging pin 23. As an incident to the movement of the indicator plate to the position where tooth 74 is retained by detent 78, cam surface 58c of the indicator plate is moved into alignment with recess 67 of the body member 24. When the cartridge is re-inserted into the camera with "Side 2" up, pin 23 will ride against the cam surface 58c further shifting the indicator plate such that the tooth 74 and detent 78a will cooperate to retain the plate with indicium "2" aligned with the window 54a as shown in FIGURE 7. Indicium "2" indicates to the operator upon completion of the film run and removal of the cartridge from the camera that both runs of film have been exposed.

Opening of the cover member 33 to remove the exposed film will release tooth 74 permitting the spring to return the indicator plate 30 to its initial position with indicium "0" aligned with window 54a.

Should the operator attempt to insert the cartridge "Side 2" first when the indicium "0" appears in window 54a, the recess 67 will be substantially closed by a small blocking portion 58d on the lateral side 62 adjacent notch 58. When the recess 67 is thus blocked by the blocking portion 58d, the cartridge is prevented from contacting cartridge support plate 18 since the pin 23" cannot enter the recess 67. Thus, since the cartridge cannot contact the support plate in this position, the user cannot close the camera cover and he is effectively warned that the cartridge is inserted improperly. Similarly, an attempt to re-insert the cartridge in the "Side 1" position after "Side 2" has been exposed will serve to warn the operator of improper insertion since as an incident of the alignment of indicium "2" with window 54a by the shift of the indicator plate, a small blocking portion 56d of lateral side 64 adjacent notch 56 is moved into alignment with recess 65. Thus, the operator will be unable to re-insert a fully exposed cartridge into the camera for re-exposure of "Side 1" since the recess 65 is now blocked and cam engaging pin 23‴ cannot enter the recess preventing the cartridge from seating against the cartridge support plate 18. Therefore, the camera door cannot close, effectively warning the operator that the cartridge is improperly inserted.

The preceding description has set forth the structure and function of a film cartridge having novel indicator means incorporated therein wherein the novel means effectively warns of insertion of the cartridge in the camera body other than in a correct manner.

It will be understood that this embodiment of the invention has been used for illustrative purposes only and that various modifications and variations in the invention may be affected without departing from the spirit and scope of the novel concepts thereof and as hereinafter set forth in the appended claims.

I claim as my invention:

1. In a film cartridge for use with spool wound double run film in a motion picture camera, the improvement comprising: a body member, a cover member on the body member, means to retain said cover member closed with respect to said body member, an indicator plate having longitudinally extending substantially parallel lateral sides and being slidably mounted for limited longitudinal movement on, and parallel to, one of said members, first and second cam surfaces on opposite lateral sides of the indicator plate, each of said first and second cam surfaces adapted to be selectively engaged by a cam actuating member in the camera, resilient means to bias the indicator plate in a longitudinal direction relative to one of said members, means on said indicator plate adapted, when the cover is closed, to engage means on the other of said members when said first cam surface has been engaged and to retain the indicator plate transposed longitudinally in a selected position against the bias of said resilient means, said means to engage also being adapted to retain the indicator plate in a second longitudinally transposed position when said second cam surface has been engaged, and wherein opening of the cover member releases the means to engage to permit the indicator plate to return to its initial position.

2. In a film cartridge as in claim 1, wherein said one member on which said plate is movably mounted, has a window therein and the indicator plate has indicia viewable through said window for indicating the position of said plate relative to said member.

3. In a film cartridge as in claim 1, wherein adjacent the first and second cam surfaces on the indicator plate are first and second lateral portions adapted to be selectively engaged by said cam actuating member wherein when said first and second lateral portions are selectively engaged, said portion effectively prevents the cam actuating member from engaging the adjacent cam surface.

4. In a film cartridge as in claim 1, wherein said indicator plate has a first and second notch respectively on first and second lateral sides and blocking portions adjacent said notches, and said cover and body members have cam actuating member receiving areas therein positioned to selectively cooperate with said notches and blocking portions when said indicator plate is in a predetermined position.

5. In a film cartridge as in claim 1, wherein said cover and body members have first and second cam receiving areas therein, which areas selectively cooperate with said first and second cam surfaces of said indicator plate, said cam surfaces forming one side of first and second notches in lateral portions of said indicator plate, selected parts of said lateral portions forming a blocking area adjacent said notches, whereby the said receiving areas are selectively opened and closed when said cam surfaces and said blocking areas are interposed therein as determined by the position of the indicator plate.

6. In a film cartridge as in claim 5, wherein the notches are on opposite sides of the indicator plate and are spaced longitudinally along said indicating plate.

7. In a film cartridge for use with spool wound double run film in a motion picture camera having a cartridge support plate with a cam engaging member mounted thereon, the invention comprising: a body member, a cover member on the body member, means to retain said cover member closed with respect to said body member, an indicator plate means having longitudinally extending substantially parallel lateral sides and being slidably mounted for limited longitudinal movement on, and parallel to, one of said members, first and second cam surfaces on opposite lateral sides of the indicator plate, each of said cam surfaces adapted to be selectively engaged by a cam actuating member to transpose the indicator plate until the cartridge is seated on the cartridge support plate in the camera, and portions on the indicator plate adjacent the respective cam surfaces adapted to be selectively engaged by said cam actuating member wherein when so engaged by said cam actuating member said portions effectively prevent said cam actuating member from permitting the cartridge to be seated on the cartridge support plate.

8. In a film cartridge for use with spool wound double run film in a motion picture camera having a cartridge support plate with a cam engaging member mounted thereon, the invention comprising:
 a body member,
 a cover member mounted on said body member,
 latching means for holding said cover member closed with respect to said body member,
 an indicator plate mounted on one of said members for movement between a plurality of positions,
 retaining means for selectively retaining said indicator plate in any of said plurality of positions,
 first cam surface means on said indicator plate engageable with said cam engaging member when said indicator plate is in a first position to move said indicator plate to a second position and permit said cartridge to be seated on the cartridge support plate in a first position whereby one run of film may be exposed,
 second cam surface means on said indicator plate engageable with said cam engaging member when said indicator plate is in said second position to move said indicator plate to a third position and permit said cartridge to be seated on the cartridge support plate in a second position whereby a second run of film may be exposed,
 a first blocking portion on said indicator plate adjacent said first cam surface, said first blocking portion being engageable with said cam engaging member when said indicator plate is in said third position to prevent said cartridge from being seated on the cartridge support plate in said third position,
 a second blocking portion on said indicator plate adjacent said second cam surface, said second blocking portion being engageable with said cam engaging member when said indicator plate is in said first position, to prevent said cartridge from being seated on the cartridge support plate in said first position,
 whereby the cartridge will be capable of being seated on the cartridge support plate when inserted in a proper manner to expose the first run of film first and will be incapable of being seated on the cartridge support plate so as to permit exposure of the second run of film first or to re-expose the film.

9. The film cartridge of claim 8 wherein said indicator plate is mounted for slidable movement in a side of said cartridge in a direction parallel to the top and bottom surfaces of said cartridge,
 resilient means for biasing said indicator plate to said first position,
 said resilient means being adapted to return said indicator plate to said first position from any position in which it is retained by said retaining means when said cover is opened.

References Cited by the Examiner

UNITED STATES PATENTS

| | | | |
|---|---|---|---|
| 3,145,613 | 8/1964 | Mueller | 352—77 |
| 3,157,880 | 11/1964 | Easterly et al. | 352—78 |
| 3,175,222 | 3/1965 | Nerwin | 352—72 |

JULIA E. COINER, *Primary Examiner.*